Nov. 27, 1962     J. BECKER     3,065,670
OPTICAL IMAGERY SYSTEM
Filed Jan. 13, 1958     2 Sheets-Sheet 1
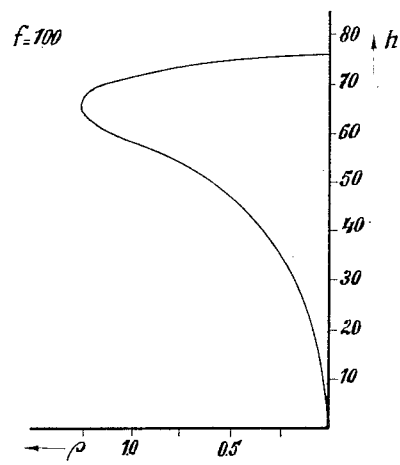
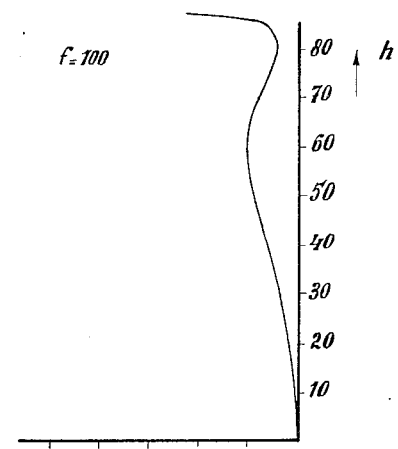
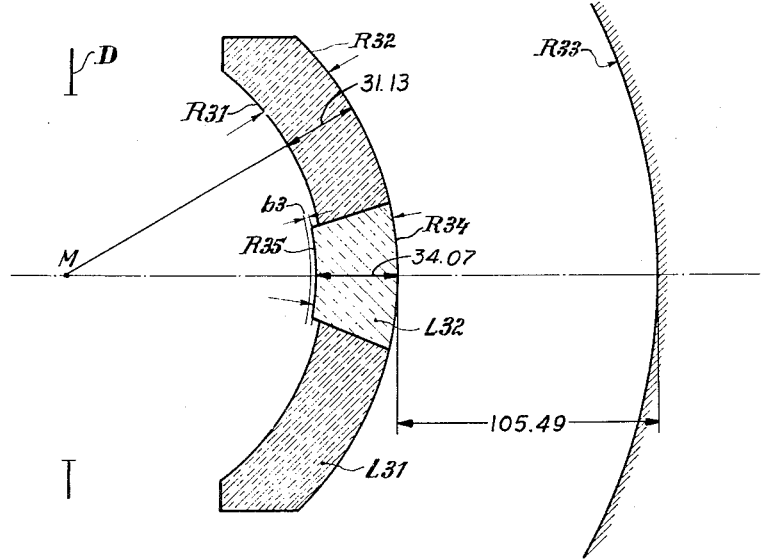
Johannes BECKER
INVENTOR.
BY Wenderoth, Lind & Ponack
Attys Nov. 27, 1962        J. BECKER        3,065,670

OPTICAL IMAGERY SYSTEM

Filed Jan. 13, 1958        2 Sheets-Sheet 2

Johannes BECKER
*INVENTOR.*

BY Wenderoth, Lind & Ponack
*Attys*

3,065,670
OPTICAL IMAGERY SYSTEM
Johannes Becker, Delft, Netherlands, assignor to N.V. Optische Industrie "De Oude Delft," Delft, Netherlands
Filed Jan. 13, 1958, Ser. No. 708,691
Claims priority, application Netherlands Jan. 12, 1957
7 Claims. (Cl. 88—57)

The invention relates to an optical system for the imagery of two conjugate surfaces, for photographic, projecting and like purposes, which optical system has for its image-forming element a concave spherical reflecting mirror to which for correcting the spherical aberration a negative meniscus lens is added whose concave side is facing the centre of curvature of the reflecting mirror and whose surfaces are concentric or substantially concentric with this reflecting mirror. Systems of this kind, referred to as "concentric mirror systems," are disclosed, for instance, in the patent to A. Bouwers, No. 2,492,461 granted December 27, 1949 and have gained great practical importance, especially in cases where a sharply defined image is required in conjunction with exceptionally high luminosity and/or a large focal length. In order to give an idea of the excellent state of correction afforded by these systems it may be mentioned that with a relative aperture of $f/1$ it is possible to obtain a circle of confusion whose diameter is less than 0.5/1000 of the focal length.

The residual aberrations which give rise to this confusion circle are caused by the fact that the spherical aberrations of the concentric meniscus lens and the concave mirror can never completely neutralize each other. The ratio of the higher orders of spherical aberration to the spherical aberration of the third order is, in fact, greater for the meniscus lens than for the concave spherical mirror. Therefore, in designing a concentric mirror system of the type referred to it is necessary to aim at a compromise giving an optimum design. The meniscus lens must be selected such that its third order spherical aberration in an absolute sense is less than that of the mirror, so as to avoid that the higher order aberration of the lens results in too great an over-compensation.

In the case of very large apertures the effect of the higher order spherical aberration of the meniscus lens will predominate to such an extent that an acceptable compromise is no longer possible, which means that the zonal errors set a limit to the applications of the system.

FIG. 1 shows the plot of the longitudinal spherical aberration of a concentric mirror system;

FIG. 2 shows the curve analogous to FIG. 1 of the longitudinal spherical aberration of a system according to the invention; and FIGS. 3, 4, and 5 show three different embodiments of the optical system according to the invention.

Figure 4:
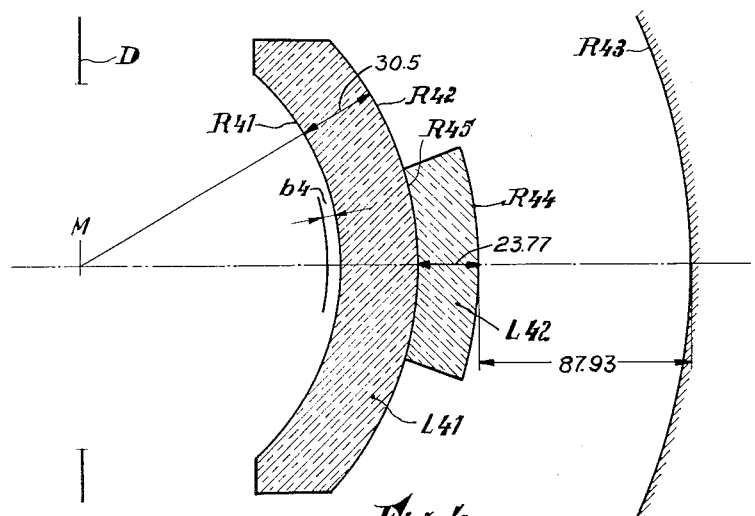

By way of elucidation of the foregoing the longitudinal spherical aberration of a concentric mirror system of the type described above has been plotted in FIG. 1 as a function of the height of incidence $h$ of light rays travelling parallel to the optical axis. It can clearly be seen that in a certain zone the higher order aberrations of the meniscus lens cause a sharp bend in the characteristic. The residual error of the objective system under discussion with a relative aperture of $f/0.65$ amounts to 1.25% of the focal length.

The residual error furthermore depends upon the thickness of the concentric meniscus lens used. For a given corrective effect, that is, for a given negative strength, a thicker meniscus has more faintly curved surfaces, so that the higher orders of spherical aberration bear a smaller and hence more advantageous ratio to the aberration of the third order.

If the meniscus lens is situated between the spherical mirror and its centre of curvature, it is of course necessary to avoid positioning of the image in the glass body of the corrector lens. The latter may of course be divided into two components spaced a certain distance apart in such a way that the image is positioned between the two components, or the corrector lens may be selected so that the image is formed at a position in front of the lens, the entire corrector lens thus being traversed twice by the light rays; however, in both cases the total glass thickness of the corrector lens must be very great if a sufficient unobstructed distance between the image surface and the nearest corrector surface is to be obtained. Increasing the thickness of the corrector lens in order to reduce the zonal aberrations is a method which, for various reasons, is not to be recommended. With extremely large apertures even the thickest possible corrector lens introduces too great an over-compensation. Besides, the thicker corrector lens entails the drawback of a heavier weight of glass and it is difficult to make pieces of optically pure glass of the required dimensions. Moreover, the larger thickness of glass to be traversed by the light rays result in greater absorption of light energy and in larger chromatic aberrations. Lastly, the greater divergence of the beam between the meniscus and the concave mirror necessitates larger dimensions of the mirror, which in turn increases both the cross-sectional dimensions of the system and the total weight. This method does not, therefore, provide an acceptable solution of the difficulties mentioned herein before.

Earlier efforts have been made to reduce the residual errors in the case of very large apertures. One of these methods consists in adding to the existing type of concentric system a supplementary element which is located at the centre of curvature of the mirror and is provided with at least one aspherical refractive surface (Patent No. 2,448,699 granted September 7, 1948 to A. Bouwers). According to another solution a conical lens element likewise mounted at the centre of curvature of the mirror is added to the system (as described in Patent No. 2,821,107 granted January 28, 1958 to A. Bouwers).

According to both solutions the improvement effected in the correction of spherical aberration is, however, accompanied by the introduction of a slight astigmatism, owing to the fact that the elements added are not concentric.

According to the invention the object in view is achieved by a different means which does not entail loss of the concentricity of the system. For this purpose a second negative meniscus lens whose surfaces are likewise concentric or substantially concentric with the reflecting surface of the mirror is incorporated in the system in such a way that it is only traversed by the light rays between the reflecting surface of the mirror and the conjugate surface situated nearest to this reflecting face. In other words, the second meniscus is situated in the beam at a location where said beam is in the highest degree convergent or divergent.

This second meniscus lens will naturally take over a part of the corrective function of the first one, as a result of which the first meniscus may be weaker. It has been found, however, that the contribution made towards correction of the spherical aberration of the concave mirror by a second meniscus lens mounted in the manner described, shows a surprisingly good ratio between higher order spherical aberration and that of the third order. In systems with extremely large apertures, e.g. larger than $f/0.8$, this meniscus lens may even have an under-correcting effect of higher orders on the rays with the greatest incidence height, which effect acts in opposition to the excess of over-correction of the first meniscus lens and may thus compensate for this excess.

FIG. 2 shows the curve analogous to FIG. 1, of the longitudinal spherical aberration of a system according to the invention. It appears from this graph that the zonal under-correction in an optimum design according to the invention may be much smaller than in a system showing a state of correction as given by FIG. 1. On account of the greatly reduced effect of the higher-order overcorrection of the first meniscus lens the portion of the curve between the incidence heights 60 and 80 declines to a much lesser extent in the direction of over correction than is the case in FIG. 1, while at incidence heights over 80 the curve actually shows that the higher order over correction of the second meniscus lens is rapidly decreasing and, eventually, is reversed to under correction so that the curve is bent to the left. Thanks to this advantageous corrective condition the residual error of an objective with $f=100$ and a relative aperture $f/0.6$ is only 0.25, representing a fivefold improvement as compared with the system to which FIG. 1 refers.

In the optical system according to the invention one is at liberty, to dimension the elements in such a way that the thickness of material traversed by the light rays between the concave mirror and the conjugate surface situated nearest to the mirror is greater than the thickness of the first meniscus lens. It is advantageous to do so, as an increase of the said material thickness results in a further decrease in strength (and hence in thickness) of the first meniscus. A weaker (thinner) first meniscus lens is always preferable on account of the saving in weight and the reduction in size of the mirror which is achieved by lesser divergence. The said thickness of material may be furnished either by the second meniscus lens alone or by the second and first meniscus lens together.

In a concentric system in which the first meniscus lens is mounted between the centre of curvature of the concave mirror and the mirror itself and thus has its convex side facing the mirror, the thickness of the meniscus will further depend upon the unobstructed distance it is desired to obtain between the conjugate surface situated nearest to the mirror on the one hand and the nearest meniscus lens surface facing such conjugate surface on the other hand. The provision of such an unobstructed space is necessary, for instance, in the case of a camera objective designed to permit the interposition of a roller blind shutter, colour filters and similar devices in front of the image surface, which in this case constitutes the conjugate surface referred to. Calculations have shown that solutions giving satisfaction in every respect can be arrived at if the thickness of the first meniscus lens remains less than $0.3f+b$, where $f$ is the focal length of the system and $b$ the aforementioned unobstructed distance.

With the same embodiment of the concentric system, that is, with the first meniscus lens and the concave mirror mounted on the same side of the centre of curvature, it is also advantageous to make the smallest radius of curvature of the second meniscus lens, smaller than the smallest radius of curvature of the first meniscus lens. This may be achieved, for instance, by cementing the second meniscus lens to the concave surface of the first one or by placing the second meniscus lens in a central perforation of the first in such a way that the second meniscus projects in the direction of the centre of curvature. The advantage of this embodiment when used in cameras is that the distance between the image surface and the front face of the first meniscus lens is increased, as a result of which the conveyance of film to and from the image area is not impeded by the edge portions of this meniscus. The smaller distance between the image surface and the meniscus lens surface having the smallest radius of curvature, that is, the front surface of the second meniscus lens has no serious implications as this meniscus lens has a much smaller diameter.

The two menisci are preferably made of different optical material. It is for instance, advantageous to select for the first corrector lens a grade of glass having a high index of refraction, which, on the basis of a certain required unobstructed distance as defined hereinbefore, affords the possibility of a further reduction in thickness of the first corrector. It is still desirable, however, to select for the first meniscus lens a grade of glass having the least possible dispersion in order to minimize the chromatic aberrations introduced by this meniscus. In the available grades of glass, as is well known, low dispersion is in most cases actually accompanied by a low index of refraction.

Calculations have shown that it is possible to bring the grade of correction of the system according to the invention up to a very high level in the case of extremely large apertures by adding a conical lens element to the system. For this purpose the system comprising two concentric meniscus lenses is calculated in such a way that, if the central portion of the beam is cut out, as is always the case in mirror systems, the light rays emanating from the axial point of the object unite to form an image having substantially the shape of a ring surrounding the optical axis. The constant deviation given to all of the light rays by the conical lens reduces this ring-shaped image to a point on the optical axis. It was found that in a system according to the invention, comprising two meniscus lenses, this collection of the rays to form a ring-shaped image can be realized with a high degree of precision even in the case of extremely large apertures. Moreover, the diameter of the said ring was found to be comparatively small, so that only a small angle of slope of the conical lens is required. Errors of asymmetry and astigmatism are not, therefore, introduced by the conical lens to an appreciable extent.

It may be observed that it is a known feature per se (see British patent specification No. 610,798) to add to a concentric mirror system a meniscus lens that is traversed solely by the light rays between the concave spherical mirror and the nearest conjugate surface. The system concerned here, however, is a concentric system in the form of a so-called Mangin mirror, in which the thickness of the primary meniscus—which has a reflecting back surface and is traversed twice by the light rays—is extremely great. This gives rise to all the difficulties that are specifically and intentionally avoided in the system according to the invention, namely, high absorption, large cross-sectional dimensions, pronounced chromatic aberration and heavy weight.

Figure 5:
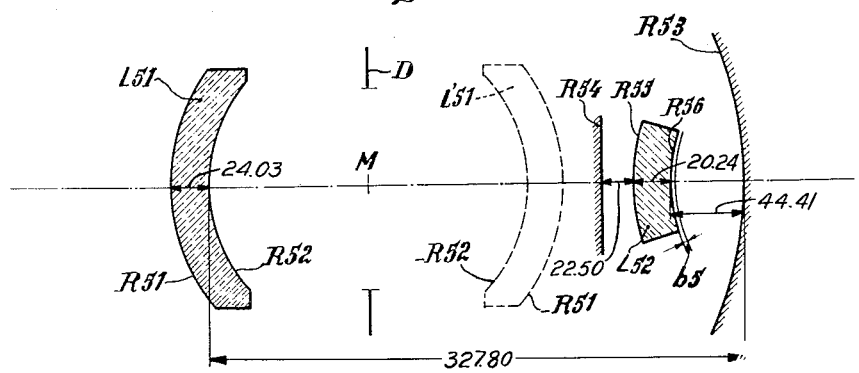

FIGURES 3, 4 and 5 show three embodiments of the optical system according to the invention, the optical data of which are given hereinafter. All three systems are purely concentric, that is, the centres of curvature of the surfaces of the meniscus lenses coincide with each other and with the centre of curvature M of the concave mirror. D in the figures denotes the diaphragm located at the centre M, whilst $b$ is the unobstructed distance defined in the foregoing.

In FIG. 3 the second meniscus lens L32 is mounted in a central perforation of the first meniscus lens L31 in such a way that it projects towards the centre M.

FIG. 4 gives an example of a system in which a second meniscus lens is cemented to the convex surface of the first meniscus lens which is traversed twice by the light-rays.

In the two FIGURES 3 and 4 the first meniscus lens is situated on the same side of the centre M as the concave mirror.

On the other hand, in FIG. 5 the first meniscus lens L51 and the concave mirror are mounted on either side of M, whilst a plane mirror R54 is placed in the most convergent (divergent) beam. This plane mirror ensures that the nearest conjugate surface (e.g. the image face, in cases where the system is used as a camera objective) is positioned close to the concave mirror. It is easy, for instance, to incorporate in this surface the photosensitive element of a television pick-up tube or the photocathode of an image amplifier tube, the tubes being passed for this purpose through a hole in the concave mirror.

The dotted lines in FIG. 5 show that the first meniscus may, by way of alternative, be mounted on the other side of M (L'51). It is known that this, thanks to the concentricity of the system, has no effect whatsoever on the imagery. The data given below thus apply equally to the latter case, with the exception of the signs for the radii of curvature R51 and R52.

It will be understood that though in the system of FIG. 5 the centres of curvature of the surfaces of the second meniscus corrector lens L52 do not coincide at M in a purely geometrical sense due to the presence of the plane mirror R54 these surface are nevertheless concentric with the spherical mirror R53 in an optical sense, the mirror R54 having no other objects than to fold the light rays travelling from the spherical mirror R53 towards the short conjugate surface.

The data of the systems according to FIGURES 3, 4 and 5 are as follows:

[FIG. 3; $f=100$; relative aperture $f/0.67$]

| Meniscus L31 | R31=−104.37 | $n_d=1.571$ |
| --- | --- | --- |
|  | R32=−135.50 |  |
| Thickness of meniscus L31 | =31.13 |  |
| Airspace between meniscus and mirror | =105.49 |  |
| Mirror | R33=240.99 | $b=1.4$ |
|  | R34=+135.50 |  |
| Meniscus L32 | R35=+101.43 | $n_d=1.571$ |
| Thickness of meniscus L32 | =34.07 |  |

[FIG. 4; $f=100$; relative aperture $f/0.7$]

| Meniscus L41 | R41=−106.0 | $n_d=1.571$ |
| --- | --- | --- |
|  | R42=−136.5 |  |
| Thickness L41 | =30.5 |  |
| Mirror | R43=−248.2 | $b=5.8$ |
|  | R44=+160.27 |  |
| Meniscus L42 | R45=+136.5 | $n_d=1.571$ |
| Airspace between mirror and L42 | =87.93 |  |
| Thickness L42 | =23.77 |  |

[FIG. 5; $f=100$; relative aperture $f/0.8$]

| Meniscus L51 | R51=+121.09 | $n_d=1.517$ |
| --- | --- | --- |
|  | R52=+97.06 |  |
| Thickness L51 | =24.03 |  |
| Airspace between L51 and concave mirror | =327.80 |  |
| Mirror concave | R53=−230.74 | $b=1.2$ |
| Mirror plane | R54=∞ |  |
| Meniscus L52 | R55=+121.44 | $n_d=1.620$ |
|  | R56=+101.20 |  |
| Thickness L52 | =20.24 |  |
| Distance between concave mirror and L52 | =44.41 |  |
| Distance between L52 and plane mirror | =22.50 |  |

It is of course understood that various well known elements may be added to the system above described for purposes other than spherical aberration correction and not impairing the state of spherical correction obtained solely by the two meniscus lenses. For example, plane mirrors such as the secondary mirror R54 shown in FIG. 5 or other plane mirrors positioned at any point of the system for bending or folding the path of the light rays may be added with no effect on the correction of spherical aberration. Also there may be added well known plane-parallel transparent elements such as plane-parallel color correcting plates or window or filter glasses at such positions in the system where they do not influence the state of correction of spherical aberration obtained by the two meniscus lenses.

What I claim is:

1. In an optical system for the imagery of conjugate surfaces comprising a concave spherical front surface mirror, means to correct for the spherical aberration of said spherical mirror consisting in a first meniscus lens in optical alignment with said spherical mirror and axially air spaced therefrom, said first meniscus lens having spherical surfaces substantially concentric with said spherical mirror and being positioned in front of said spherical mirror to be traversed by light rays travelling between the long conjugate surface and said spherical mirror, and a second meniscus lens having likewise spherical surfaces substantially concentric with said spherical mirror, seid second meniscus lens being positioned to be traversed only by the light rays travelling between said spherical mirror and the short conjugate surface, the ratio at the maximum height of incidence of the higher orders of spherical aberration to the third order of spherical aberration being substantially lower for said second meniscus than for said first meniscus lens.

2. In an optical system for the imagery of conjugate surfaces comprising a concave spherical front surface mirror the spherical aberration correcting means as claimed in claim 1 wherein said first meniscus lens is so positioned between the center of curvature of said spherical mirror and said spherical mirror as to be traversed twice, once by the light rays travelling between said long conjugate surface and said spherical mirror and once by the light rays travelling between said spherical mirror and said short conjugate surface.

3. In an optical system for the imagery of conjugate surfaces comprising a concave spherical front surface mirror the spherical aberration correcting means as claimed in claim 2, wherein said second meniscus lens is cemented to one of the surfaces of said first meniscus lens.

4. In an optical system for the imagery of conjugate surfaces comprising a concave spherical front surface mirror the spherical aberration correcting means as claimed in claim 1 wherein said first meniscus lens is positioned between said center of curvature of said spherical mirror and said spherical mirror has a thickness smaller than $0.3f+b$, wherein $f$ is the equivalent focal length of the optical system and $b$ the air space between the short conjugate surface and the surface of said first and second meniscus lenses having the smallest radius of curvature.

5. In an optical system for the imagery of conjugate surfaces comprising a concave spherical mirror, means to correct for the spherical aberration of said spherical mirror consisting in first and second meniscus lenses in optical alignment with said spherical mirror, said first meniscus lens having a central aperture and substantially concentric spherical surfaces and facing with its concave surface the long conjugate surface, said spherical mirror being axially spaced from said first meniscus lens and substantially concentric with said surfaces of said first meniscus lens, said second meniscus lens having substantially concentric surfaces which are also substantially concentric with said spherical mirror and being mounted in said central aperture of said first meniscus lens, whereby the light rays travelling between the long conjugate surface and said spherical mirror traverse said first meniscus lens and travelling between said spherical mirror and the short conjugate surface traverse said second meniscus lens, said first and second meniscus lenses substantially correcting all of the spherical aberration of said spherical mirror.

6. In an optical system for the imagery of conjugate surfaces comprising a concave spherical front surface mirror the spherical aberration correcting means as claimed in claim 5 wherein said concave surface of said first meniscus lens has a radius of curvature exceeding that of the concave surface of said second meniscus lens.

7. In an optical system for the imagery of conjugate surfaces comprising a concave spherical front surface mirror the spherical aberration correcting means as claimed in claim 5 wherein said second meniscus lens has a thickness exceeding that of said first meniscus lens.

References Cited in the file of this patent

UNITED STATES PATENTS

| | | |
|---|---|---|
| 2,409,971 | Bennett | Oct. 22, 1946 |
| 2,608,129 | Taylor | Aug. 26, 1952 |
| 2,642,488 | Epstein | June 16, 1953 |
| 2,730,013 | Mandler | Jan. 10, 1956 |
| 2,821,107 | Bowers | Jan. 26, 1958 |

FOREIGN PATENTS

| | | |
|---|---|---|
| 490,252 | Italy | Feb. 6, 1954 |